(12) United States Patent
Molinero

(10) Patent No.: US 11,996,799 B2
(45) Date of Patent: May 28, 2024

(54) METHOD FOR MAKING PHOTOVOLTAIC SLATS FOR PHOTOVOLTAIC BLINDS

(71) Applicant: SCUOLA UNIVERSITARIA PROFESSIONALE DELLA SVIZZERA ITALIANA (SUPSI), Manno (CH)

(72) Inventor: Ruben Roldan Molinero, Lugano (CH)

(73) Assignee: SCUOLA UNIVERSITARIA PROFESSIONALE DELLA SVIZZERA ITALIANA (SUPSI), Manno (CH)

( * ) Notice: Subject to any disclaimer, the term of this patent is extended or adjusted under 35 U.S.C. 154(b) by 0 days.

(21) Appl. No.: 17/917,667

(22) PCT Filed: Apr. 7, 2020

(86) PCT No.: PCT/EP2020/059855
§ 371 (c)(1),
(2) Date: Oct. 7, 2022

(87) PCT Pub. No.: WO2021/204358
PCT Pub. Date: Oct. 14, 2021

(65) Prior Publication Data
US 2023/0155538 A1    May 18, 2023

(51) Int. Cl.
*H02S 20/26* (2014.01)
*E06B 9/24* (2006.01)

(52) U.S. Cl.
CPC ............. *H02S 20/26* (2014.12); *E06B 9/24* (2013.01); *E06B 2009/2476* (2013.01)

(58) Field of Classification Search
None
See application file for complete search history.

(56) References Cited

U.S. PATENT DOCUMENTS

2007/0175599 A1   8/2007  Froese
2011/0126992 A1*  6/2011  Yordanova ............. H02S 20/30
                                                        160/405
(Continued)

FOREIGN PATENT DOCUMENTS

CN    108222330 A   6/2018
JP    2004-027661 A  1/2004
(Continued)

OTHER PUBLICATIONS

Oct. 28, 2020 International Search Report issued in International Patent Application No. PCT/EP2020/059855.
(Continued)

*Primary Examiner* — Daniel P Malley, Jr.
(74) *Attorney, Agent, or Firm* — Oliff PLC

(57) ABSTRACT

A method for making a photovoltaic slat for a photovoltaic blind, including the steps of: providing a photovoltaic sheet including at least one photovoltaic strip, said photovoltaic strip including at least one string of thin film solar cells monolithically connected to each other in series; cutting out a portion of the photovoltaic sheet having a shape of a slat suitable for a blind, said portion including at least one of said strings; and providing in said portion of the photovoltaic sheet at least two through holes suitable for being passed through by connection elements for connecting a plurality of slats in a blind.

4 Claims, 14 Drawing Sheets

(56) References Cited

U.S. PATENT DOCUMENTS

| | | |
|---|---|---|
| 2012/0180863 A1 | 7/2012 | Lim et al. |
| 2018/0195766 A1* | 7/2018 | Cheun .................... H02S 30/20 |
| 2018/0204967 A1* | 7/2018 | Hall ...................... H01L 31/048 |
| 2019/0055779 A1* | 2/2019 | Lee ......................... E06B 9/322 |
| 2020/0185554 A1* | 6/2020 | Choi ....................... H02S 30/20 |

FOREIGN PATENT DOCUMENTS

| | | |
|---|---|---|
| JP | 2014-205959 A | 10/2014 |
| WO | 2020/078548 A1 | 4/2020 |

OTHER PUBLICATIONS

Oct. 28, 2020 Written Opinion issued in International Patent Application No. PCT/EP2020/059855.

* cited by examiner

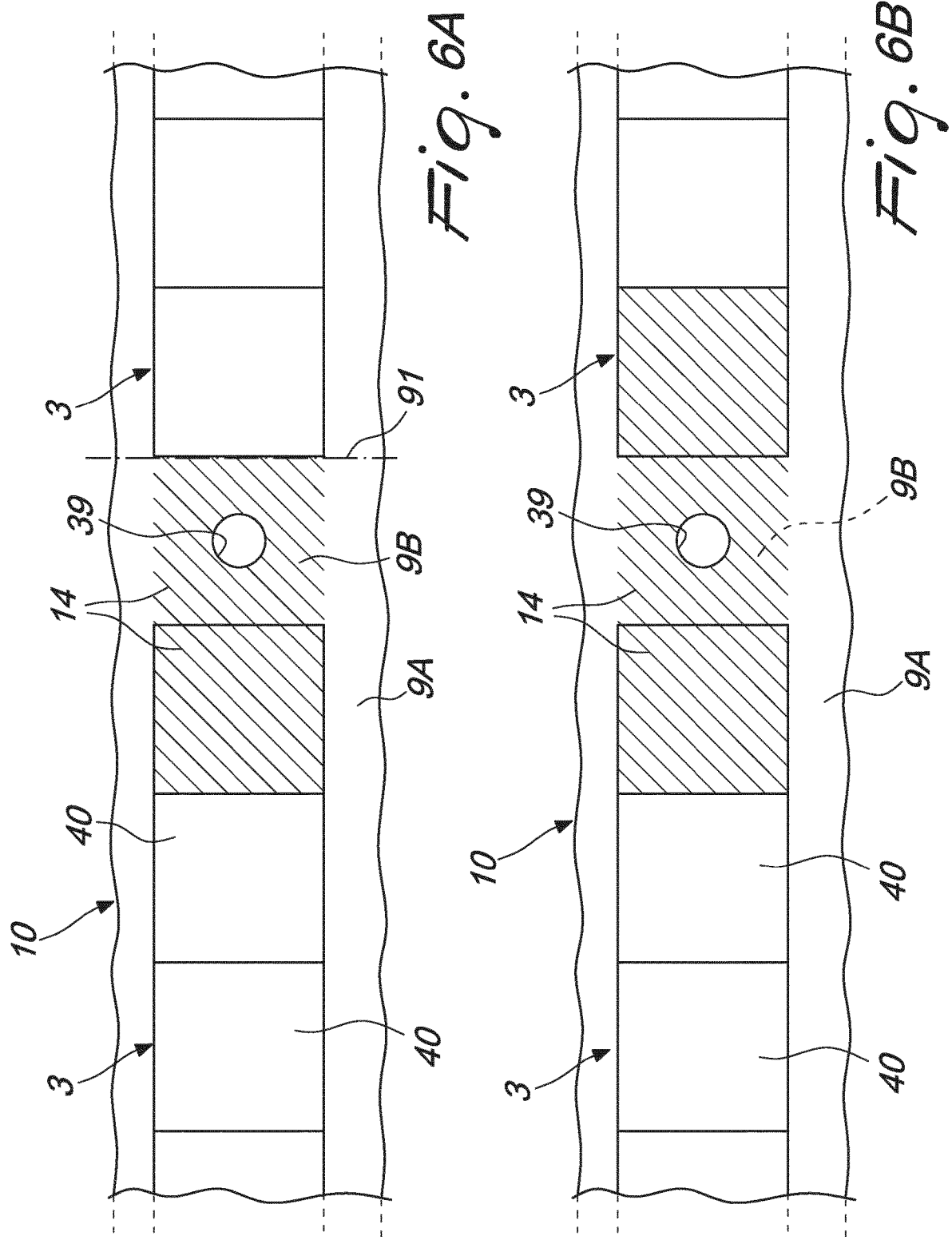

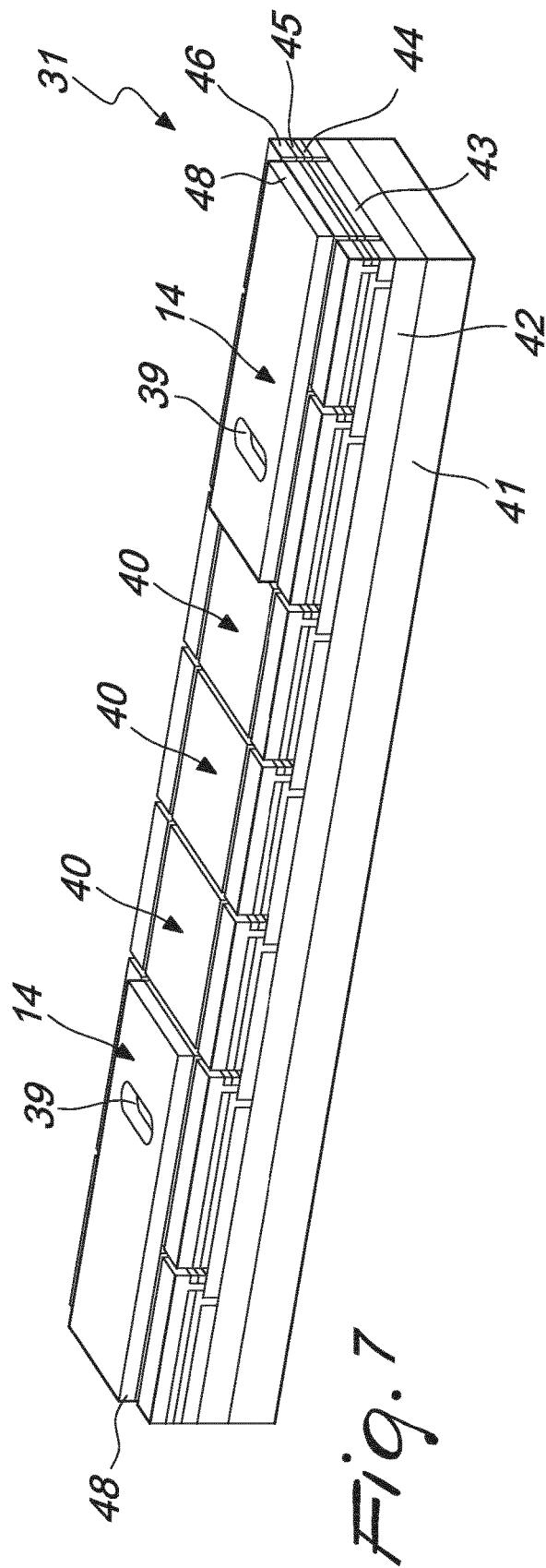

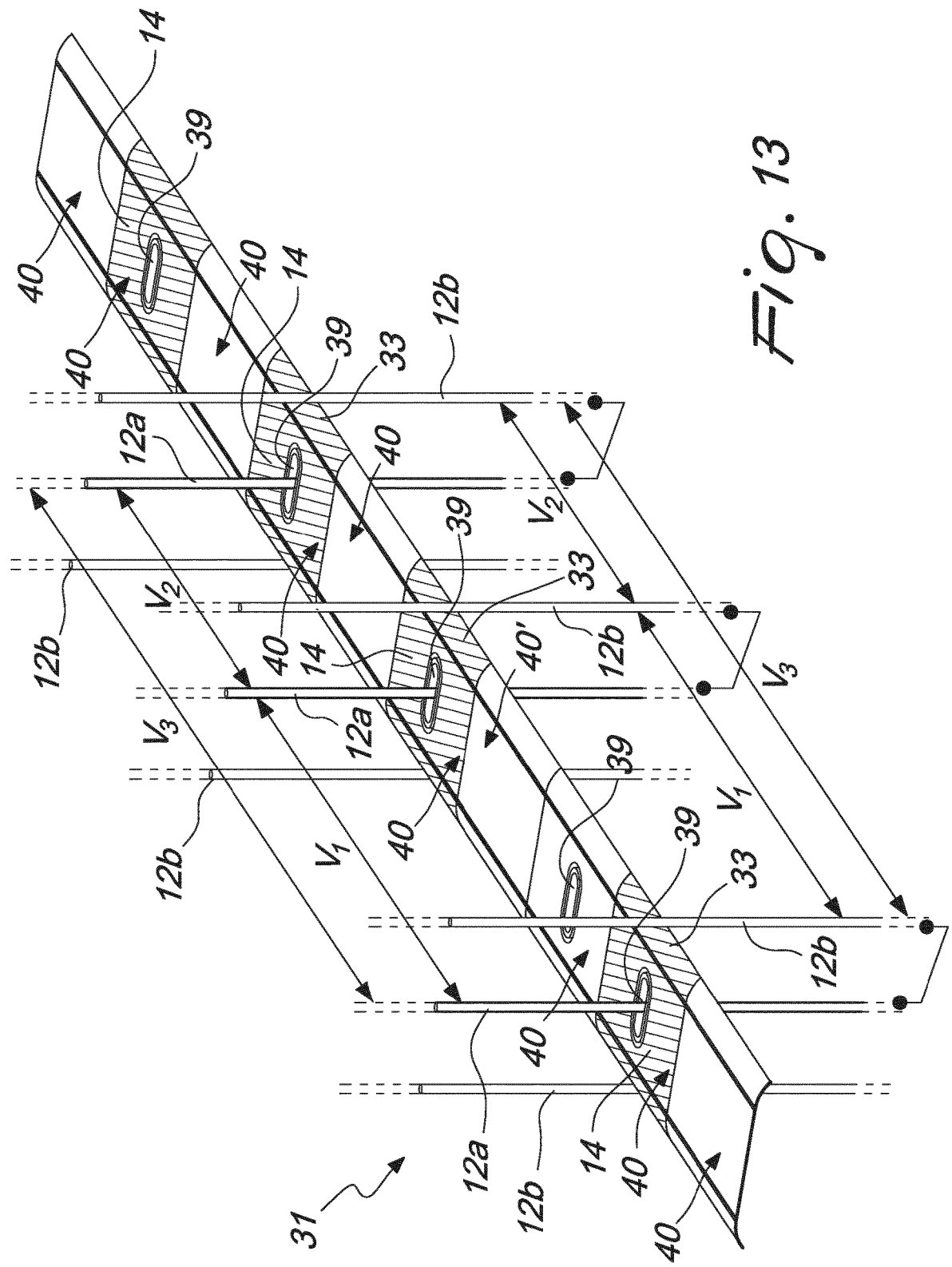

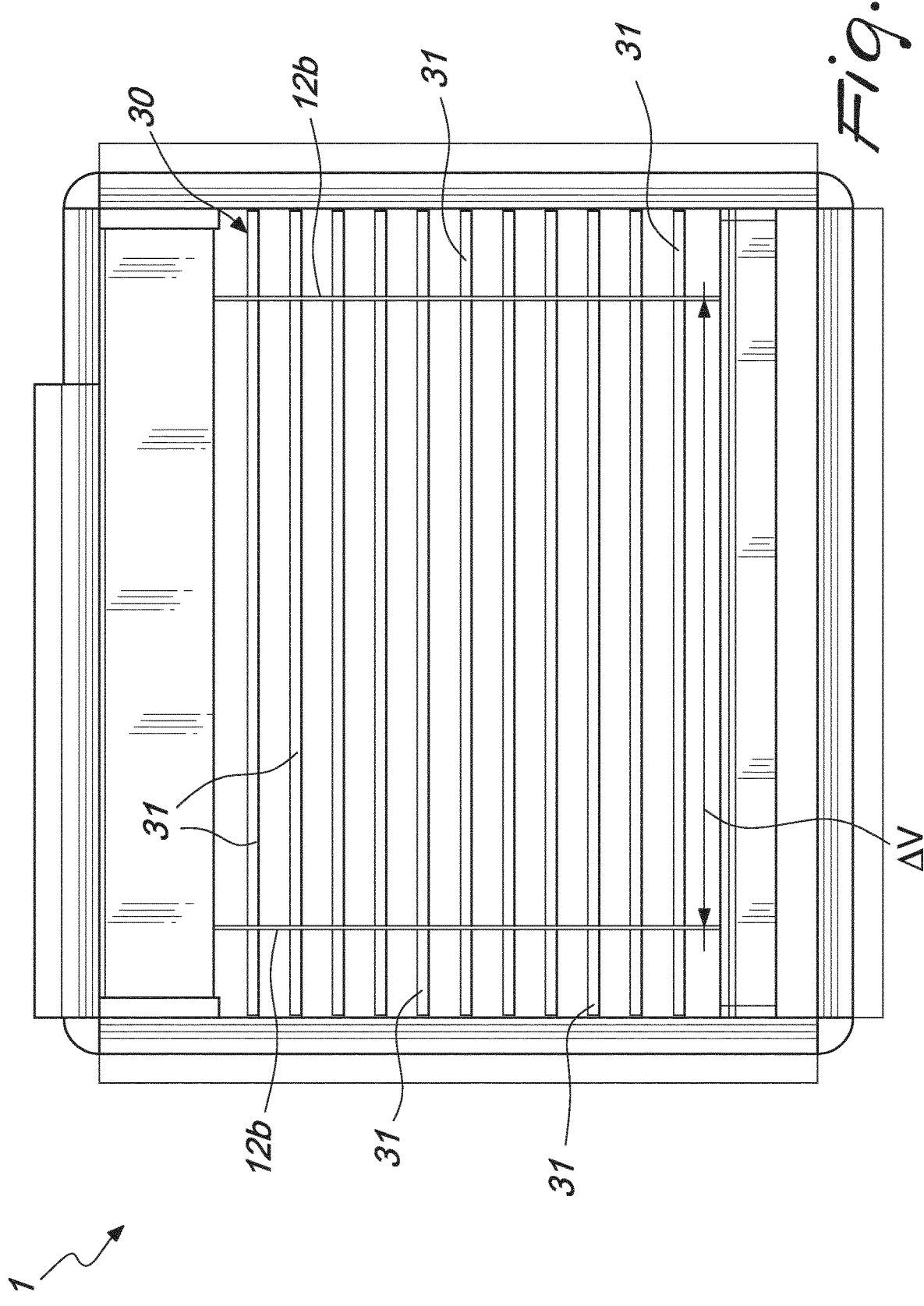

METHOD FOR MAKING PHOTOVOLTAIC SLATS FOR PHOTOVOLTAIC BLINDS

The present invention relates to a method for making a photovoltaic slat for a photovoltaic blind, in particular for a blind of the Venetian type.

As known, a photovoltaic blind is an apparatus suitable for closing an opening on a facade of a building (typically a window) and generating electricity from solar radiation which passes through the opening.

Such photovoltaic blinds comprise a traditional Venetian blind comprising a plurality of photovoltaic slats, normally made of plastic or metallic material, on which are later fixed photovoltaic cells of the crystalline silicon type.

At this point it is useful to specify that the term "photovoltaic slat" is understood to reference in a fully general manner any slat that comprises solar cells.

The photovoltaic cells are then connected to each other by means of additional wiring which needs to be arranged in the window structure in such a way to not interfere with the movement of the blind.

US 2018/0195766 discloses photovoltaic slats for photovoltaic blinds wherein solar cells modules having solar cells are attached to the convex curved surface of a pre-existing conventional slat.

US 2007/0175599 discloses photovoltaic slats for photovoltaic blinds wherein conventional solar cells are mounted within recesses which are previously provided in a slat made of extruded plastic.

Although functional, the known photovoltaic slats have limitations, especially regarding handling, speed of production and features such as flexibility and form factor. The complete fabrication process involves several separate steps to prepare and process cells and circuit assemblies before a photovoltaic slat is complete. Using crystalline silicon technology, individual cells must be sorted and wired together and assembled into the photovoltaic circuit, which must be carefully placed and positioned prior to the lamination process and final assembly. The complexity of this manufacturing process strongly influences the market price of the device.

Furthermore, the size of such assembly tends to be too large to retrofit conventional windows.

The aim of the present invention is to solve the technical problem described above, obviate the drawbacks and overcome the limitations of the background art, by providing a method for making a photovoltaic slat that is simpler, quicker and more cost-effective with respect to the prior art.

Within the scope of this aim, an object of the present invention is to provide a method for making a photovoltaic slat that makes it possible to make photovoltaic slats which have a more compact structure with dimensions which can be smaller than the prior art.

Another object of the present invention is to provide photovoltaic slats which are more flexible and versatile in their design with respect to the prior art.

Moreover, an object of the present invention is to provide photovoltaic slats having an assembly that is easier with respect to the prior art.

Another object of the present invention is to provide an alternative to known solutions.

A further object of the present invention is to provide photovoltaic slats that require less maintenance.

This aim, these objects and others which will become better apparent hereinafter are achieved by a method according to claim 1.

Further characteristics and advantages will become better apparent from the description of some preferred but not exclusive embodiments of a method for making a photovoltaic slat, illustrated by way of non-limiting examples with the aid of the accompanying drawings, wherein:

FIGS. 5A-5D and 6A-6B show a series of different possible configurations of the electrical contact areas and of the through holes in a photovoltaic strip of a photovoltaic sheet according to the invention;

FIG. 7 is a schematic representation of the structure of a portion of a photovoltaic sheet, which forms a photovoltaic slat, according to a first way for carrying out the method according to the invention;

FIG. 8 is a vertical cross-section of part of the portion of FIG. 7;

FIG. 13 is a perspective view of a further possible embodiment of a photovoltaic slat according to the invention, in connection with the connection elements;

Figures 14A, 14B, 14C:
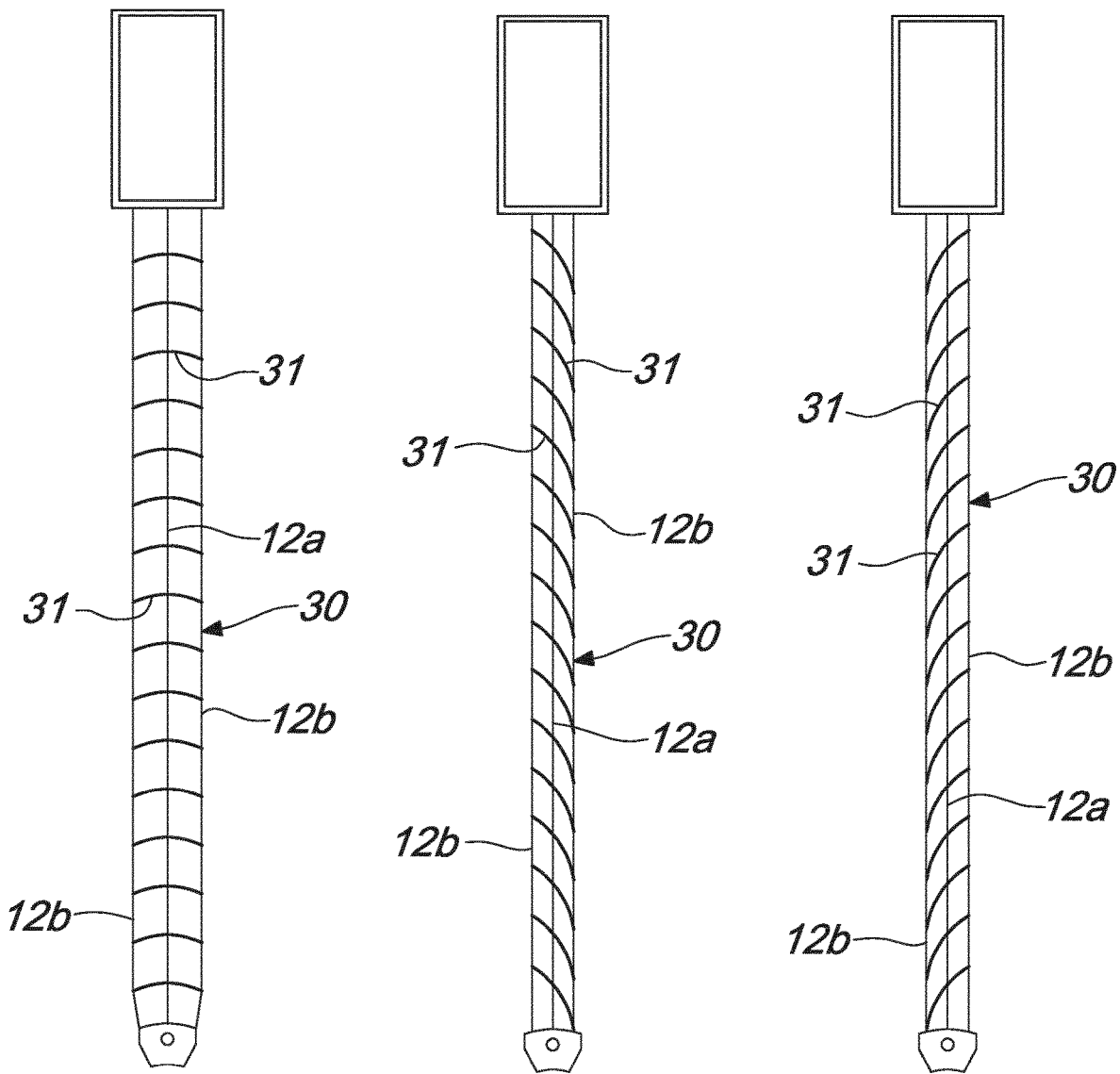

FIGS. 14A, 14B, and 14C are cross-sectional side views of a blind comprising photovoltaic slats according to the invention, with the slats rotated in different positions;

FIG. 15 is a schematic front view of the blind of FIGS. 14A-14C, arranged in a window.

With reference to the cited figures, the method for making a photovoltaic slat 31 for a photovoltaic blind 30, according to the invention, comprises the steps of (preferably in order):

a. providing a photovoltaic sheet 10, 10' comprising at least one photovoltaic strip 2, each photovoltaic strip 2 comprising at least one string 3 of thin film solar cells 40 monolithically connected to each other in series;

b. cutting out a portion of the photovoltaic sheet 10, 10' in the shape of a slat 31 suitable for a blind 30, said portion comprising the photovoltaic string 3;

c. providing in said portion of the photovoltaic sheet 10, 10' (and preferably within the photovoltaic string 3 comprised in said portion) at least two through holes 39 suitable for being passed through by connection elements 12a for connecting a plurality of slats 31 into a blind 30.

Regarding the step a., the term "photovoltaic sheet" is understood to reference a sheet comprising a deposition of a plurality of active layers (comprising junction layers 44, 45 made of well-known semiconductors of p-type and n-type) which form a plurality of solar cells 40.

With particular reference to FIGS. 7-8 and 10-11, the photovoltaic sheet 10, 10' in turn comprises: a substrate 41, at least one insulating layer 42 arranged on the substrate 41, a back contact layer 43 arranged on the at least one insulating layer 42, a plurality of junction layers 44, 45 arranged on the back contact layer 43 and at least a front contact layer 46 arranged on the plurality of junction layers 44, 45.

Preferably, the substrate 41 is a flexible substrate and even more preferably is metallic, for instance made of aluminum (Al) or stainless steel (SS) or titanium (Ti) or magnesium (Mg).

The insulating layer 42 is preferably made of oxides of silicon (SiOx) or alumina (Al2O3) or polyamide and it is interposed between the substrate 41 and the overlying layers (i.e. the back contact layer 43, 44, the junction layers 44, 45 and the front contact layer 46) which are active, so as to avoid electrical contact between the substrate 41 and the overlying active layers 43, 44, 45, 46.

Optionally, the photovoltaic sheet 10 further comprises a second insulating layer (not illustrated), arranged on the other side of the substrate 41 (i.e. the substrate's surface that lies opposite with respect to the surface on which the above mentioned back contact layer 43 and the junction layers 44, 45 are deposited), in order to prevent possible short-circuits when the photovoltaic slats 31 are in contact, for example during the raising or the lowering of the blind 30.

The back contact layer 43 is preferably a back metal contact layer, and even more preferably is made of molybdenum (Mo), deposited on the insulating layer 42.

The junction layers 44, 45 are preferably made of well-known semiconductors of p-type and n-type so to realize p-n junctions.

The at least one front contact layer 46 preferably comprises a transparent conducting oxide layer (TCO), such as a layer of aluminum doped zinc oxide (ZnO:Al), for collecting and transporting the photo-generated charge carriers.

Optionally, the at least one front contact layer 46 is provided with a metal contact grid 47, for example arranged above the transparent conducting oxide layer, to transport the electric current more efficiently.

Optionally, a polyethylene terephthalate (PET) or ethylene-vinyl acetate (EVA) or any other plastic foil laminating the photovoltaic sheet is arranged above the at least one front contact layer 46 to provide protection from possible damage or contaminants during handling and processing.

The photovoltaic sheet 10, 10' further comprises interconnection grooves 51, 52, 53 (or scribing steps) which define in the photovoltaic sheet 131 a plurality of thin film solar cells 40, monolithically connected to each other in series.

Various different structures of thin film solar cells monolithically connected to each other in series are well-known in the photovoltaic technologies field. The skilled person can thus provide a photovoltaic sheet 10, 10' comprising interconnection grooves 51, 52, 53 which define in the photovoltaic sheet 10, 10' a plurality of thin film solar cells 40, monolithically connected to each other in series, according to the invention.

In some embodiments the plurality of thin film solar cells 40 comprises single-junction thin film solar cells 40 monolithically connected, in other embodiments the plurality of thin film solar cells 40 comprises multi junction thin film solar cells monolithically connected.

In the illustrated and non-limiting examples, in particular with reference to the single-junction CIGS solar cell structure visible in FIGS. 7, 8, 10 and 11, the junction layers 44, 45 comprise:

a first junction layer 44, namely an absorber layer, made of a semiconductor of the p-type, preferably a deposition of Cu(In,Ga)Se2, deposited on the back metal contact layer 43, and a second junction layer 45, namely a buffer layer, made of a semiconductor of the n-type, preferably a layer of cadmium sulfide CdS, deposited on the absorber layer 44.

In certain embodiments (not shown), between the junction layers 44, 45 and the at least one front contact layer 46 (e.g. between the buffer layer 45 and the transparent conducting oxide layer) an intrinsic zinc oxide (i-ZnO) layer is further provided to protect the underlying junction layer 45 from sputter damage in the subsequent step of the fabrication process, wherein the least one front contact layer 46 (e.g. a transparent conducting oxide (TCO) is sputtered on top of the intrinsic zinc oxide (i-ZnO) layer.

A possible configuration of the interconnection grooves 51, 52, 53 is shown in the figures, still related to the non-limiting example of the single-junction CIGS solar cell structure. In greater detail, in this example, the interconnection grooves 51, 52, 53 comprise:

first interconnection grooves 51 extending through the back contact layer 43 and which are filled by the first junction layer 44 (i.e. the absorber layer);

second interconnection grooves 52 extending through the first junction layer 44 (i.e. the absorber layer) and the second junction layer 45 (i.e. the buffer layer) and filled by the front contact layer 46 (i.e. the transparent conducting oxide layer);

third interconnection grooves 53 extending through the front contact layer 46 (i.e. the transparent conducting oxide layer), the second junction layer 45 and the first junction layer 44 and remaining empty (i.e. unfilled with further material).

As can be understood by looking at the figures, the first interconnection grooves 51 are substantially parallel and not coincident with respect to the second interconnection grooves 52 which, in turn, are substantially parallel and not coincident with respect to the third interconnection grooves 53; in other words the grooves 51, 52, 53 have a certain offset.

In this way, the first junction layer 44 extends into the first grooves 51 and is in contact with the insulating layer 42, and the front contact layer 46 extends into the second grooves 52 and is in contact with the back contact layer 43.

Preferably, the interconnection grooves 51, 52, 53 are provided by laser scribing. Alternatively, other patterning techniques for forming the interconnection grooves 51, 52, 53 can be used, for instance: silk screening with resist masks, etching with positive or negative photoresists, mechanical scribing, electrical discharge scribing.

Accordingly, in the preferred way for carrying out the method, the step a. of providing a photovoltaic sheet 10, 10' in turn comprises the steps of:

a1. providing a substrate 41;

a2. Applying (e.g. depositing) on said substrate 41 at least one insulating layer 42, one back contact layer 43, a plurality of junction layers 44, 45 and a front contact layer 46, so as to form a photovoltaic sheet 10, 10' and providing, within said back contact layer 43, within said plurality of junction layers 44, 45 and within said front contact layer 46, interconnection grooves 51, 52, 53, so as to define in the photovoltaic sheet 10, 10' at least one photovoltaic strip 2 comprising at least one string 3 of thin film solar cells 40 monolithically connected to each other in series.

Preferably, in the step a2. at least a back contact layer, at least two junction layers and at least a front contact layer, such as a transparent conducting oxide layer (TCO), are deposited, in such a way that the junction layers define the required single p-n (or p-i-n) junctions or multi p-n (or p-i-n) junctions.

In greater detail, in one possible embodiment, wherein the single thin film solar cells 40 are CIGS single-junction solar cells, the step a2., in turn, comprises the following steps:

- depositing or gluing at least one insulating layer 42 on the substrate 41 (in one single step performed for all the sheet 10 for every strip 2 which is comprised in the sheet 10);
- depositing a back contact layer 43 on the insulating layer 42 (in one single step performed for all the sheet 10 for every strip 2 which is comprised in the sheet 10);
- cutting the back contact layer 43 so as to provide first interconnection grooves 51, for example by laser scribing or by any other patterning techniques already mentioned (in one single step performed for all the sheet 10 for every strip 2 which is comprised in the sheet 10);
- depositing a first junction layer 44, namely an absorber layer made of a semiconductor of the p-type, on the back metal contact layer 43 in such a way that the absorber layer 44 fills the first interconnection grooves 51 (in one single step performed for all the sheet 10 for every strip 2 which is comprised in the sheet 10);
- depositing a second junction layer 45, namely a buffer layer made of a semiconductor of the n-type, on the first junction layer 44 (in one single step performed for all the sheet 10 for every strip 2 which is comprised in the sheet 10);
- cutting the second junction layer 45 and the first junction layer 44, so as to provide second interconnection grooves 52, for example by laser scribing or by any other patterning techniques (in one single step performed for all the sheet 10 for every strip 2 which is comprised in the sheet 10);
- depositing a front contact layer 46, namely a transparent conducting oxide layer, on the second junction layer 45 in such a way that the front contact layer 46 fills the second interconnection grooves 52 (in one single step performed for all the sheet 10 for every strip 2 which is comprised in the sheet 10);
- cutting the front contact layer 46, the second junction layer 45 and the first junction layer 44, so as to provide third interconnection grooves 53, for example by laser scribing or by any other patterning techniques (in one single step performed for all the sheet 10 for every strip 2 which is comprised in the sheet 10).

As to the photovoltaic strip 2, the term "photovoltaic strip" is understood to reference a line of solar cells (i.e. a series of solar cells aligned along a longitudinal axis). In some embodiments, each photovoltaic strip 2 consists of a continuous single string 3 of thin film solar cells 40 monolithically connected to each other in series.

In other embodiments, each photovoltaic strip 2 comprises a continuous line of strings 3 (each string being a string 3 of thin film solar cells 40 monolithically connected to each other in series).

In other embodiments, each photovoltaic strip 2 comprises:

- a plurality of strings 3 of thin film solar cells 40 monolithically connected to each other in series, which are aligned along a respective longitudinal axis, and
- working areas 9B of the photovoltaic sheet which are interposed between the strings 3.

In other words, in these last embodiments, within each photovoltaic strip 2, the strings 3 are separated by a working area 9B of the photovoltaic sheet 10.

The working areas 9A, 9B are portions of the photovoltaic sheet 10 which are not active, in the sense that they are not meant to generate photovoltaic power. In practice, the working areas 9A, 9B are not provided with solar cells monolithically connected with the solar cells 49 comprised within the strings 3 (e.g. in the working areas there are no solar cells since no solar cells are defined in the layers of the photovoltaic sheet 10 during the step a. of providing a photovoltaic sheet 10, or, alternatively, in the working areas 9A, 9B there are solar cells which are isolated from the solar cells 40 comprised in the strings 3 for instance by means of isolation grooves).

Preferably, the strings 3 are defined by isolation grooves, provided in the photovoltaic sheet 10, 10', which in practice delimit the strings 3.

In practice, in some embodiments the method comprises a preliminary step of providing one or more working areas 9A, 9B in the photovoltaic sheet 10 by providing one or more isolation grooves 62, 63 which isolate said isolated areas from the solar cells 40. These working areas separate each string 3 from the next string 3 of the same strip 2 and/or each strip 2 from the next strip of the same sheet 10.

In the preferred embodiments, such isolation grooves extend at least through the back contact layer 43, the junction layers 44, 45 and the front contact layer 46.

In other words, the photovoltaic sheet 10, 10' comprises an array (or matrix) of strings 3 of solar cells 40, wherein each said string 3 constitutes an independent photovoltaic device, and wherein said strings 3 are aligned in one or more lines referred to as photovoltaic strips 2.

Figure 1:
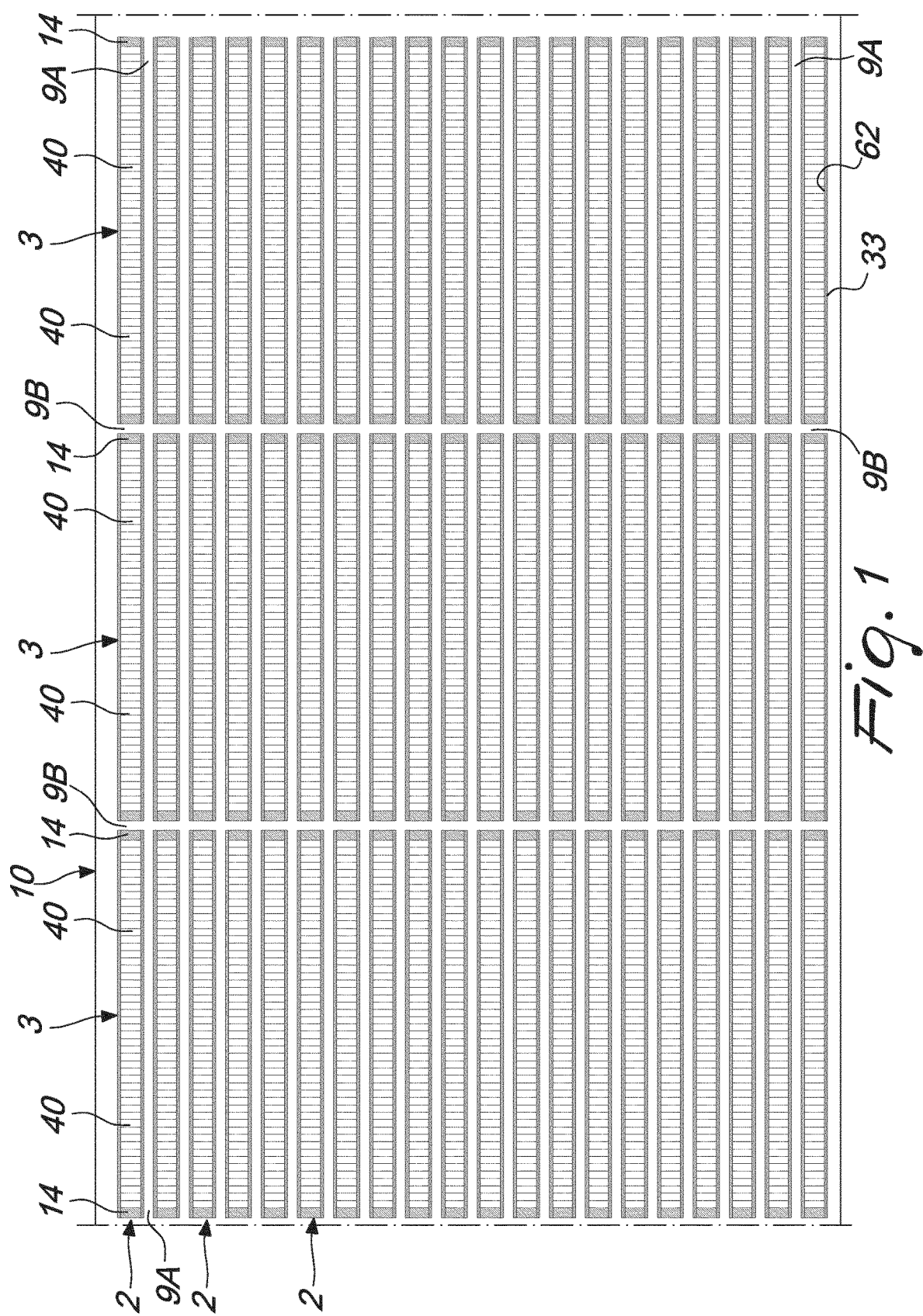
FIG. 1 is a top view of a first possible embodiment of a photovoltaic sheet according to the invention.
Figure 2:
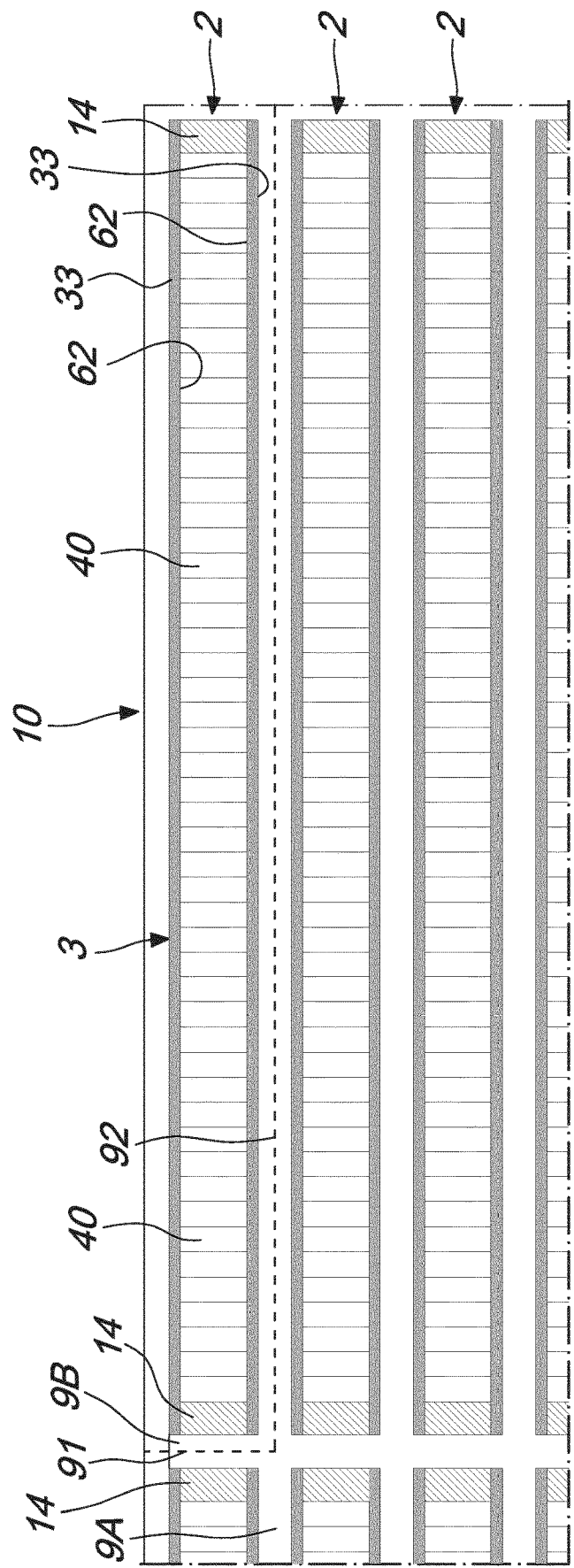
FIG. 2 is an enlarged detail of the photovoltaic sheet of FIG. 1, wherein the cut axis is depicted.
Figure 3:
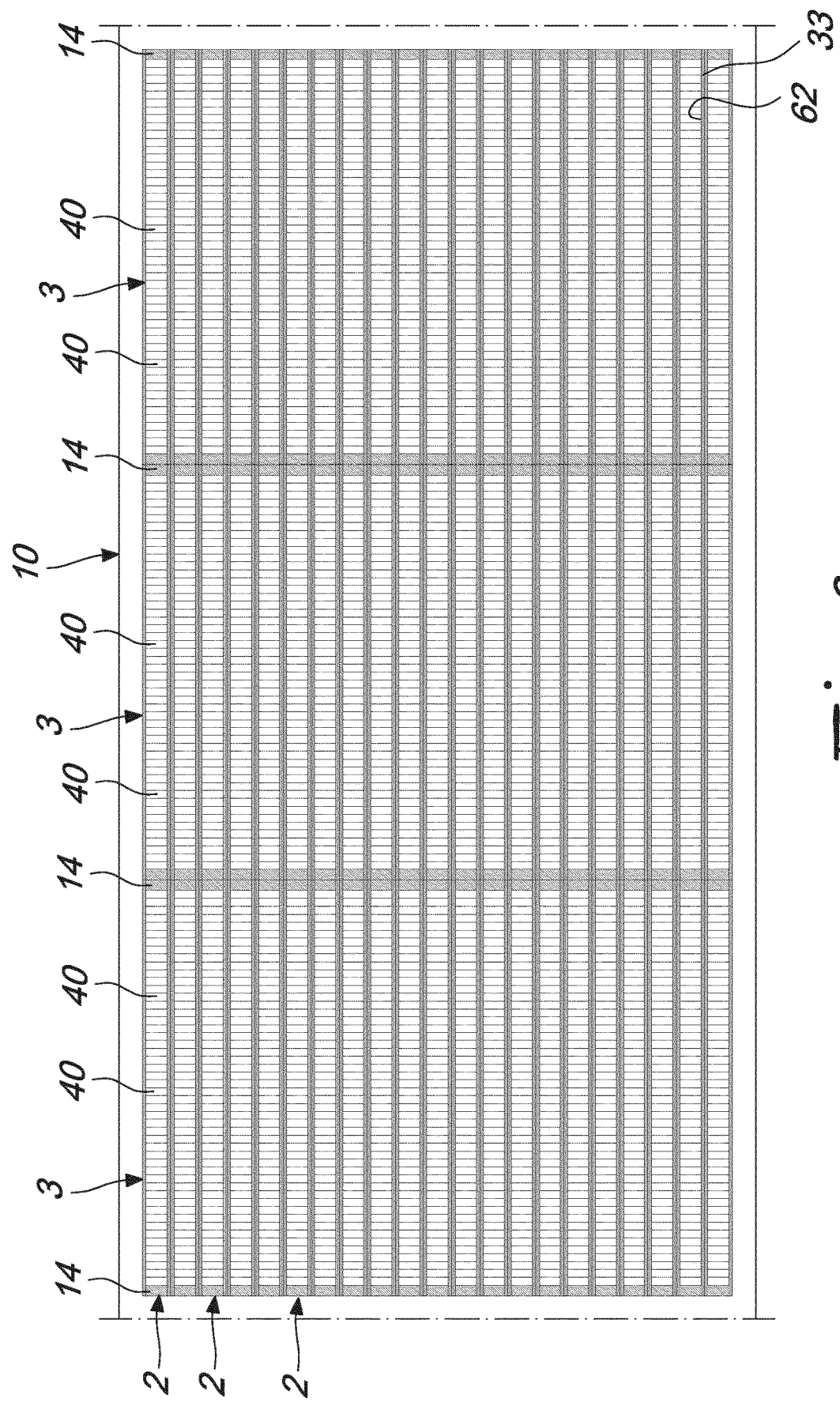
FIG. 3 is a top view of a second possible embodiment of a photovoltaic sheet according to the invention.

In some embodiments, such as the embodiment depicted in FIGS. 1 and 2, the photovoltaic sheet 10 comprises a plurality of parallel photovoltaic strips 2 which are separated by a working area 9A of the photovoltaic sheet 10.

In the step b. of cutting out, a portion of the photovoltaic sheet 10, 10' comprising one or more of the strings 3 is cut out of the sheet 10, 10'. This portion has the shape of a slat 31 suitable for a blind 30 in the sense that a skilled person can choose any suitable shape and size depending on the blind 30 the slat is intended for.

In the preferred embodiments, the slat 31 is a slat 31 for a blind 30 of the Venetian type.

In the illustrated examples, a rectangular portion is cut, in other embodiments the portion of the photovoltaic sheet 10 is cut to have different shapes, for example: rectangular with tapered ends, or oval, or trapezoidal, etc.

As will be made clearer hereinafter, the cut portion (i.e. the slat 31) may be further shaped by means of a bending step.

Preferably, in the step b. of cutting out, at least a transversal cut 91 and at least a longitudinal cut 92 are provided in the photovoltaic sheet 10, 10' so as to include in the slat 31 at least an entire string 3.

In the embodiments wherein the photovoltaic sheet 10 comprises a plurality of parallel photovoltaic strips 2 which are separated by working areas 9A, the longitudinal cut 92 is provided through said working area 9A.

In the embodiments wherein each photovoltaic strip 2 comprises a series of strings 3 which are separated by working areas 9B, the transversal cut 91 is provided through one of said working areas 9B.

In the example shown in FIG. 2, a transversal cut 91 is provided in the working area 9B between two strings 3 and a longitudinal cut 92 is provided in a working area 9A between two strips 2 so as to cut off a portion of the photovoltaic sheet 10 which includes an entire string 3.

Figure 4:
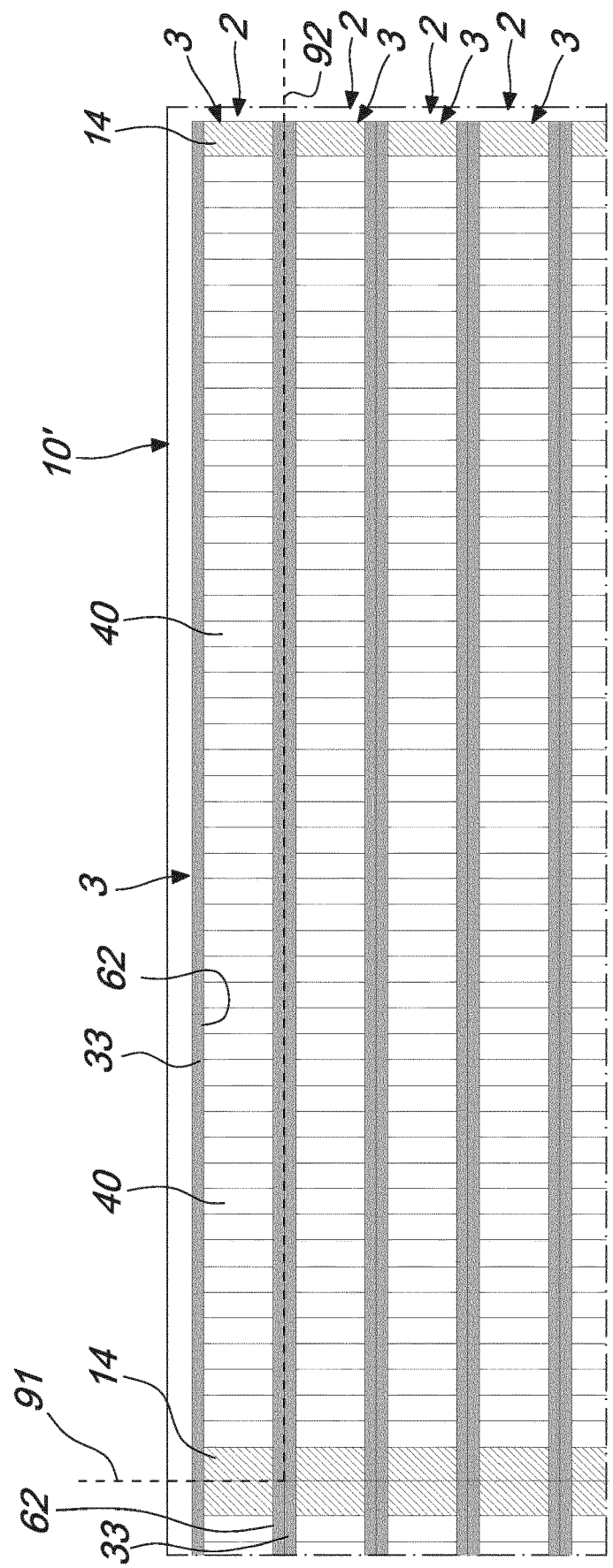
FIG. 4 is an enlarged detail of the photovoltaic sheet of FIG. 2, wherein the cut axis is depicted.

In the example shown in FIG. 4, a transversal cut 91 is provided between two strings 3 (on an electrical contact area 14, at the border between two solar cells 40) and a longitudinal cut 92 is provided in an inactive area between two strips 2, as to cut off a portion of the photovoltaic sheet 10 which includes an entire string 3.

In other embodiments, at least a transversal cut 91 and at least a longitudinal cut 92 are provided in the photovoltaic sheet 10 so as to include in the slat 31 a plurality of strings 3.

In the step c. of providing at least two through holes 39 in the cut portion (i.e. in the slat 31), two or more through holes 39 are provided in said cut portion. These through holes 39 are suitable for being passed through by connection elements 12a in the sense that they have a shape and size that allow the insertion of a predetermined connection element 12a.

The skilled person can choose any connection element suitable for connecting a plurality of slats 31 into a blind 30 depending on the blind 30 the slat is intended for.

For example, the connection elements 12a can be connection elements for a mechanical connection, such as cords, wires and the like. As will be made clearer hereinafter, the connection elements 12a will also provide electrical connection between the slats 31.

In the preferred embodiments, wherein the slat 31 is intended for a blind of the Venetian type, the connection elements 12a, 12b comprise strips or cords which, in the blind 30, will be configured to pull or push the slats 31 so as to make them translate along a first axis and/or to rotate (preferably simultaneously) around second axes (see for instance FIGS. 14A-14C).

Preferably, the method further comprises, before said step b. of cutting out, the step of:
  b1. providing, in said portion of photovoltaic sheet 10 to be cut out, two electrical contact areas 14 configured to allow the electrical contact between the thin film solar cells 40 of said string 3 and said connection elements 12a, so as to make it possible to electrically connect the slat 31 with another slat 31 via the connection elements 12a.

Then, the resulting slat 31 will be connectable to at least two connection elements 12a of a photovoltaic blind 30 in an operative configuration wherein each of the connection elements 12a passes through a respective through hole 39 and can be electrically connected to a respective electrical contact area 14 so as to be electrically connected to the solar cells 40 of the string 3 (as shown for instance in FIG. 13).

Preferably, the electrical connection between each connection element 12a and the respective electrical contact area 14 is carried out by means of an electrical connection structure 38, such as a conductive flat ribbon 38 (e.g. a copper-based ribbon) or the like, in an assembly step, carried out after the step c., consisting in:
  inserting at least two connection elements 12a into respective through holes 39, and
  electrically connecting each connection element 12a to the solar cells 40 by means of an electrical connection structure 38 which connects each connection element 12a to a respective electrical contact area 14.

At this point it is helpful to specify that the connection elements 12a do not necessarily pass through every through hole 39: in some embodiments there are more than two through holes 39 and only some of them are engaged by the connection elements 12a (see for instance FIG. 13).

In order to ensure the electrical connection, the connection elements 12a, 12b preferably comprise electrically conductive material (for example conductive textiles) and are configured to electrically and mechanically connect the photovoltaic slats 31: in other words, the connection elements 12a, 12b provide the mechanical connection together with the electrical connection of the photovoltaic slats 31.

In some embodiments (as shown in FIGS. 7 and 8), the electrical contact area 14 is provided by depositing on at least one solar cell 40 a layer of conductive material 48 which shields the solar cell 40 from solar radiation so as to make said solar cell 40 an inactive solar cell 40'.

In other embodiments, the electrical contact area 14 is provided by fixing an electrically conductive adhesive on at least one solar cell 40 (preferably on the front contact layer 46).

In yet another embodiment, the electrical contact area 14 is provided by performing a welding (e.g. laser welding or electrical welding) or a fusion on at least one of said solar cells 40 so as to fuse active layers therein (i.e. to merge the back contact layer 43, the junction layers 44, 45 and a front contact layer 46) and to make them become a permanently, electrically-conductive metalized alloy, thereby forming a conductive path between the front contact 46 and the back contact 43 layers.

In practice, the electrical contact areas 14 are configured to allow the photovoltaic generated current to flow from the active solar cells 40 to the connection elements 12a, via the connection structure 38, and vice-versa.

Obviously at least two electrical contact areas 14 are comprised in the portion that is cut to form the slat 31, so that two connection elements 12a, 12b can be respectively connected to two points of the slat 31 between which a voltage ΔV is generated.

Each electrical contact area 14 can extend on the surface of one or more solar cells 40 that are adjacent (as shown in FIGS. 5A-5D) and optionally also on a working area 9B (as depicted in FIGS. 6A-6B).

Figure 6C:
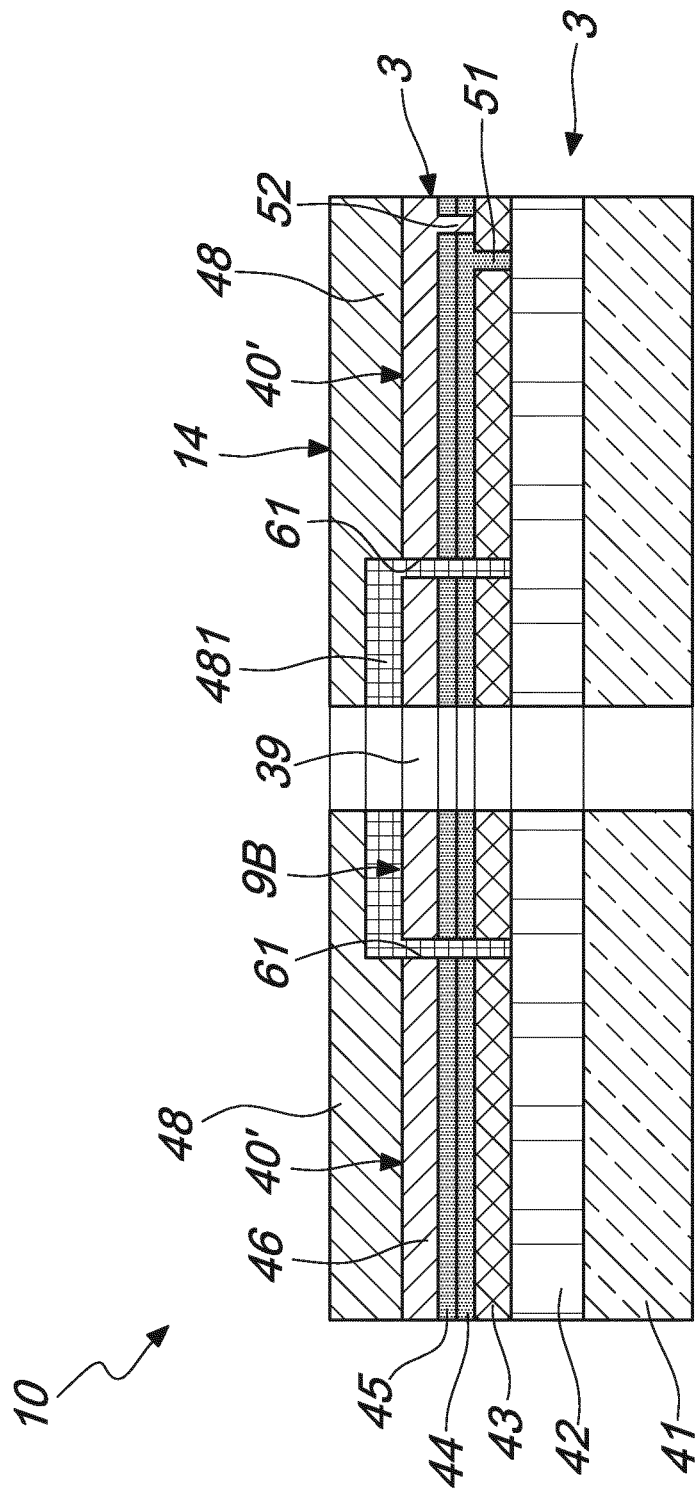
FIG. 6C is a vertical cross-section of part of the photovoltaic sheet of FIG. 6B.

In the configuration shown in FIGS. 6A-6B the electrical contact area 14 is preferably provided by applying a layer of conductive material 48 or an electrically conductive adhesive or the like. Optionally, as depicted in FIG. 6C, before applying the layer of conductive material 48 (or the electrically conductive adhesive or the like), on the working area 9B between two strings 3 a dielectric layer 481 is applied (i.e. a layer of dielectric material such as a polyamide-based material, polyamide film, poly(methyl methacrylate) PMMA, silicon oxide etc.) in order to avoid short-circuits. The layer of conductive material 48 (or the electrically conductive adhesive or the like) will thus cover the dielectric layer 481.

The through hole 39, in turn, can be provided in an electrical contact area 14, or in a solar cell 40 which is adjacent to at least an electrical contact area 14, or in a solar cell 40, 40' which is placed between two electrical contact areas 14.

Figure 5A:
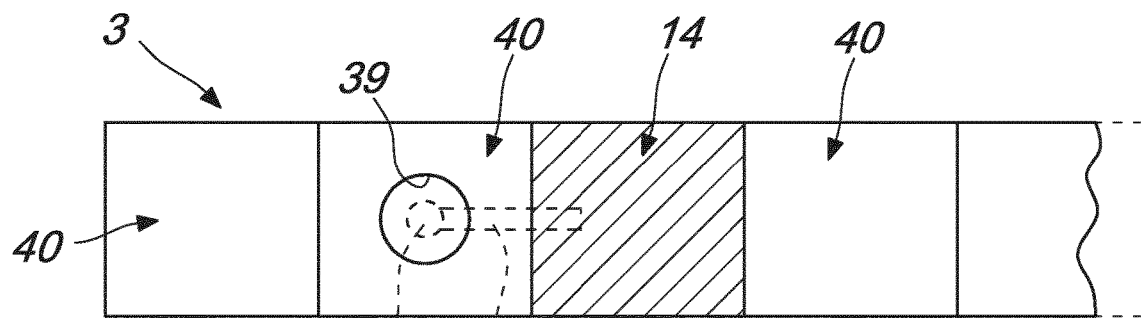

In the embodiment of FIG. 5A, a through hole 39 is provided in an active solar cell 40 which is adjacent to a solar cell 40 whereon an electrical contact area 14 is provided.

Figure 5B:
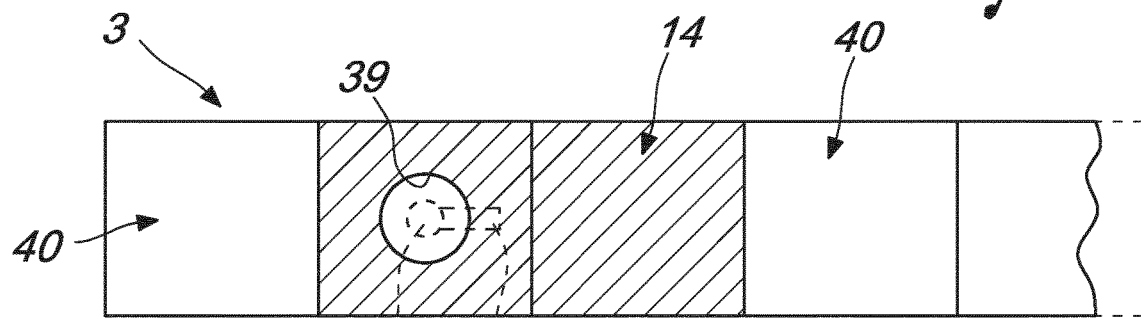

In the embodiment of FIG. 5B, an electrical contact area 14 is provided on two consecutive solar cells 40 and a through hole 39 is provided in one of these two consecutive solar cells 40.

Figure 5C:
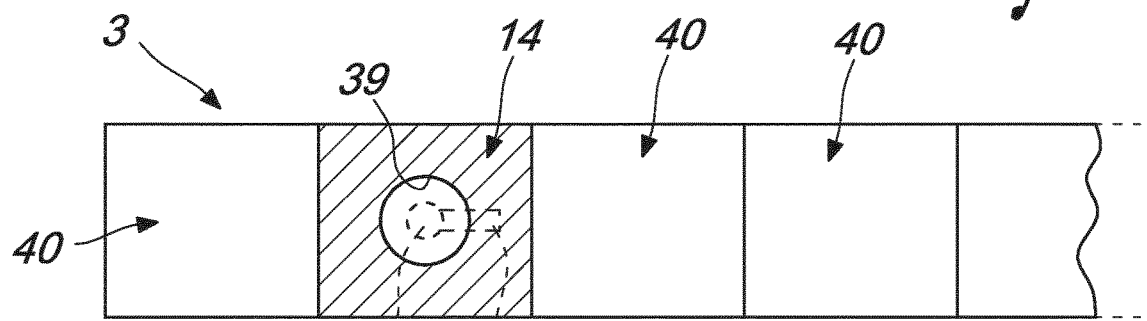

In the embodiment of FIG. 5C, an electrical contact area 14 is provided on a single solar cell 40 in which a through hole 39 is also provided.

Figure 5D:
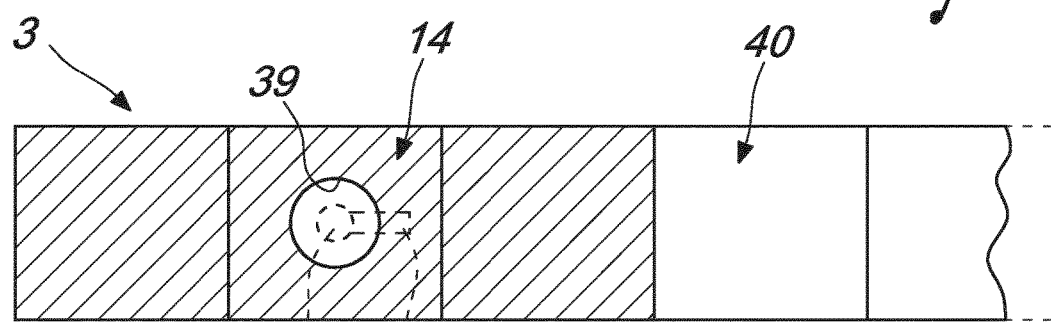

In the embodiment of FIG. 5D, an electrical contact area 14 is provided on three consecutive solar cells 40 and a through hole 39 is provided in the central cell 40 of these three consecutive solar cells 40.

In some embodiments, such as the ones of FIGS. 6A-6B, in the step b. of providing through holes 39, a through hole 39 is provided in a working area 9B between two strings 3.

In the embodiment of FIG. 6A, an electrical contact area 14 is provided which extends on a solar cell 40 placed at the end of a string 3 and on an adjacent working area 14 in which a through hole 39 is provided; in this embodiment, in the step of cutting out, a transversal cut 91 is performed in the photovoltaic sheet 10 so as to include in the slat 31 the whole contact area 14, the through hole 39 and the string 3.

In the embodiment of FIG. 6B, an electrical contact area 14 is provided which extends on a solar cell 40 placed at the end of a string 3 and on an adjacent working area 14 and also on a solar cell of the next string 3 of the photovoltaic strip 2; a through hole 39 is provided in said working area 14 between the two strings 3. In this embodiment, the electrical contact area 14 electrically connects the two illustrated strings 3; in the step of cutting out, both of the two strings 3 on which the electrical contact area 14 extends will be included in the slat 31, together with the through hole 39.

Figure 10:
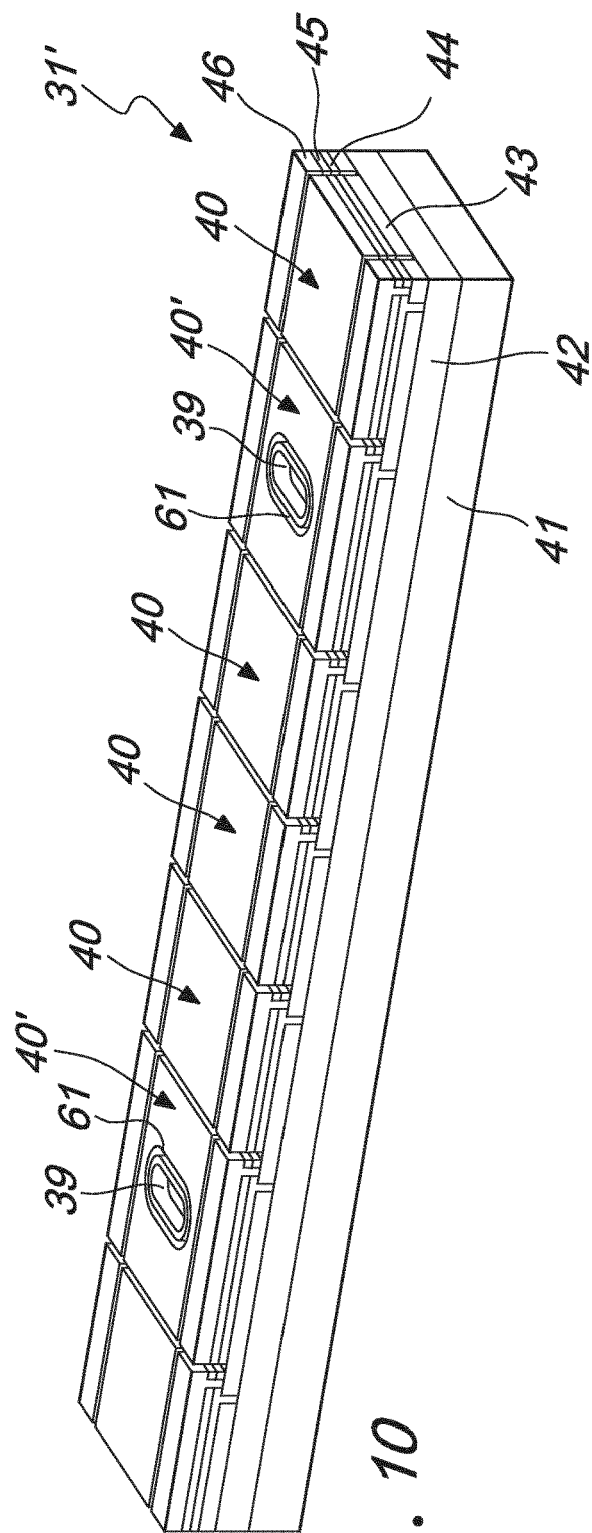
FIG. 10 is a schematic representation of the structure of a portion of a photovoltaic sheet, which forms a photovoltaic slat, according to a second way for carrying out the method according to the invention.
Figure 11:
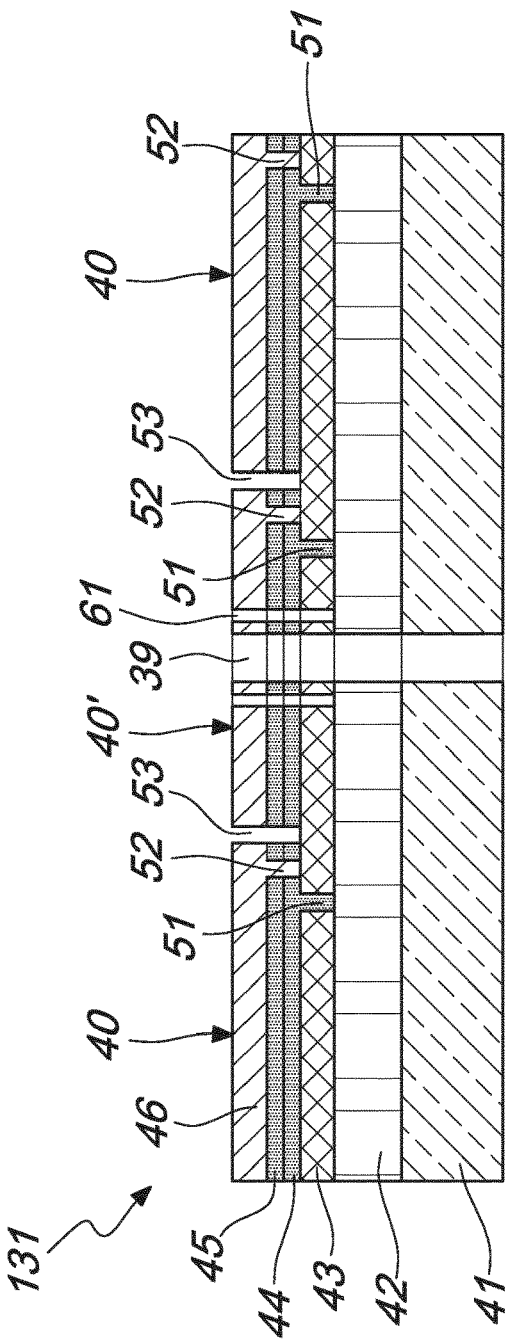
FIG. 11 is a vertical cross-section of part of the portion of FIG. 10.

In a particular embodiment shown in FIGS. 10-11, before the step b. of providing through holes 39, the method comprises a step of providing in a solar cell 40 a close-pattern isolation groove 61 so as to define an inactive area of the solar cell 40; and in the step b. of providing through holes 39, the through hole 39 is provided in said inactive area of the solar cell 40.

In greater detail, said close-pattern isolation groove 61 surrounds the through hole 39 and extends at least through the front contact layer 46, the plurality of junction layers 44, 45 and the back contact layer 43, so as to define an inactive area of the thin film solar cell 40 surrounding the through hole 39. The inactive area is, in practice, electrically isolated from the rest of the solar cell 40.

Preferably, the method further comprises, before the step b. of cutting out, a step of providing at one or more edges of the at least a photovoltaic strip 2 one or more peripheral isolation grooves 62 so as to define one or more peripheral inactive areas 33 of the photovoltaic strip 2.

In greater detail, each isolation groove 62 extends at least through the front contact layer 46, the plurality of junction layers 44, 45 and the back contact layer 43, so as to define a peripheral inactive area that is electrically isolated from the rest of the string 3.

Optionally the method further comprises a step of bending at least a portion of the slat 31.

Figure 9:
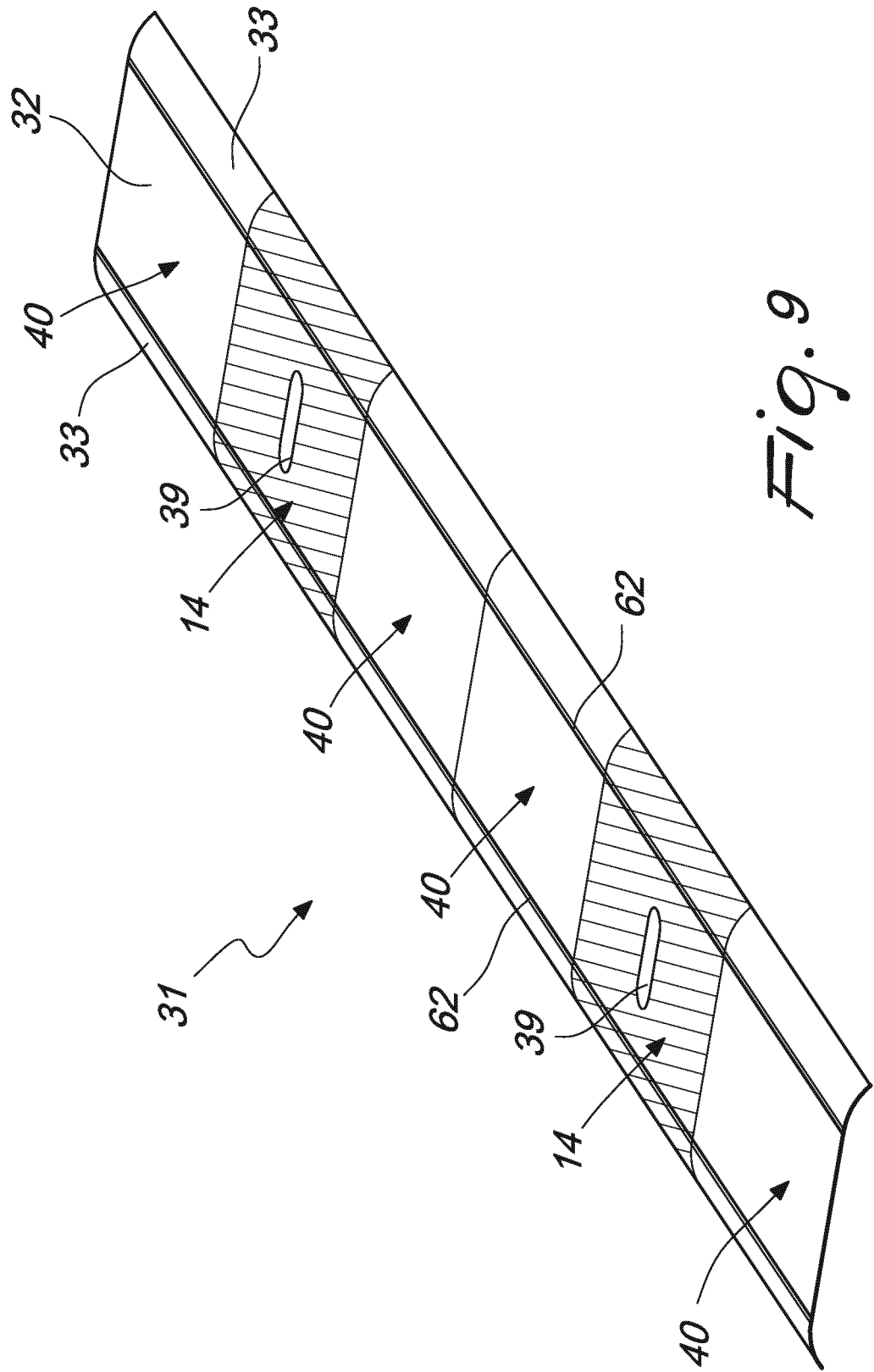
FIG. 9 is a perspective view of a first possible embodiment of a photovoltaic slat, according to the invention.
Figure 12:
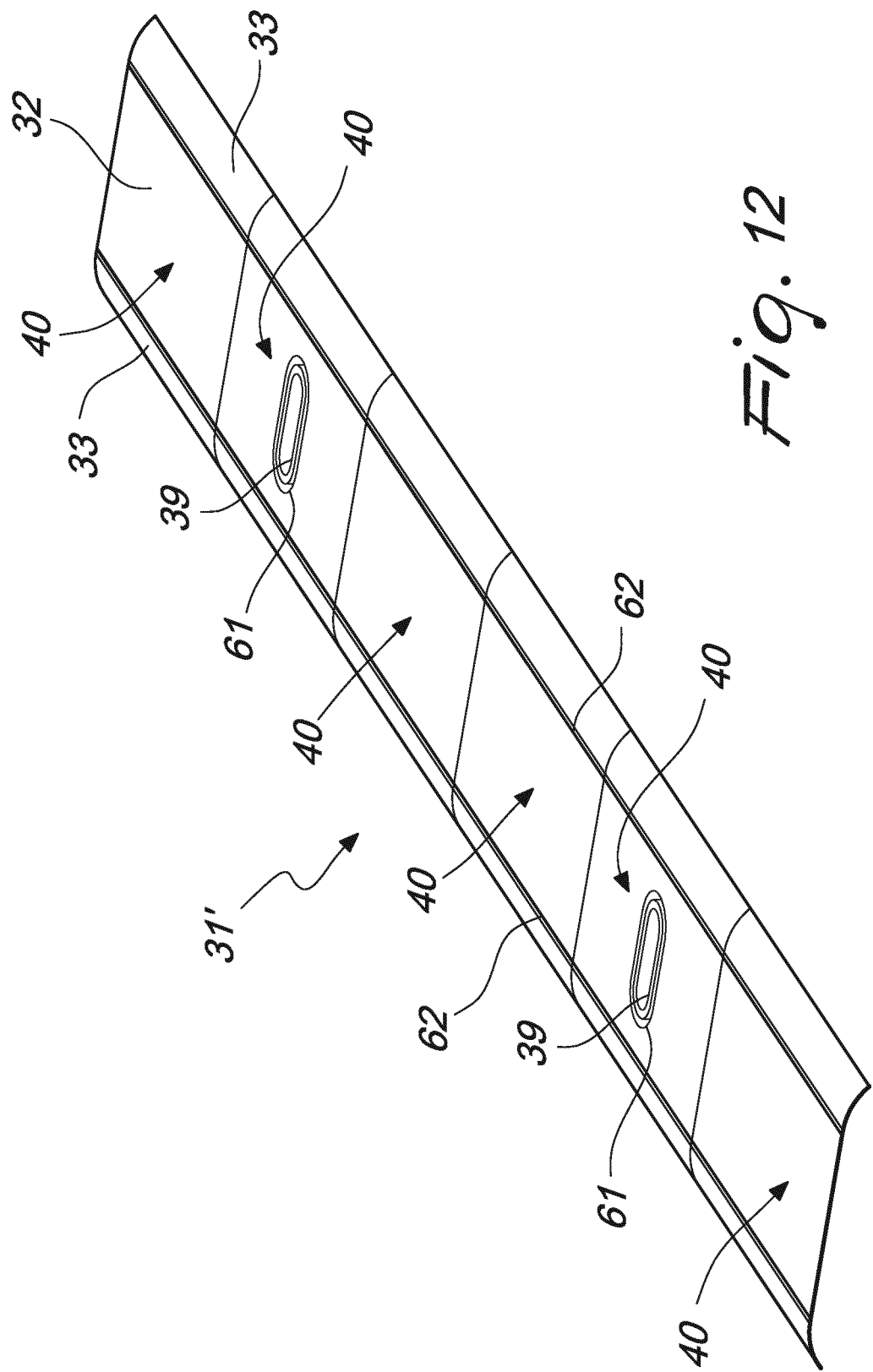
FIG. 12 is a perspective view of a second possible embodiment of a photovoltaic slat, according to the invention.

Preferably, the slat 31 is bent at said peripheral inactive area 33 (i.e. at least part of the peripheral inactive area 33 is bent), for example in the manner shown in FIGS. 9 and 12 wherein the inactive areas 33 are bowed downwards.

In general, the isolation grooves 61, 62 make it possible to make cuts, holes and mechanical treatments in general while avoiding any short-circuit or damage to the active solar cells 40.

All the above mentioned isolation grooves 61, 62 can be provided by any known patterning techniques, such as: laser scribing, silk screening with resist masks, etching with positive or negative photoresists, mechanical scribing, electrical discharge scribing.

Optionally, in the assembly steps the slats 31 can be connected, in addition to the connecting elements 12a which pass through the through holes 39, also by means of second connection elements, 12B which, for example, can be coupled to the peripheral inactive areas 33 and which are configured to make the slats rotate (preferably simultaneously) around an axis, as shown in FIGS. 14A-14C, so as to build a blind of the Venetian type such as the one that in FIG. 15 is depicted in a window.

In the embodiments shown in FIG. 13 and FIGS. 14A-14C, the photovoltaic slats 31 are assembled into a photovoltaic blind which comprises two first connection elements 12a (i.e. conductive lifting cords), each one of which is electrically connected with two second connection elements 12b (i.e. conductive orientation cords). The electrical connection between the first connection elements 12a and the second connection elements 12b is realized, in a known way, inside the bottom rail.

In practice, in the photovoltaic blind 30, the charge carriers under bias voltage $\Delta V$ move from photovoltaic slats 31 towards the connection elements 12b and 12a and then can be transmitted to an electronic device and/or to a battery pack or an inverter which converts the variable direct current output into a synchronized alternating current that can be fed into a building's electrical grid.

In a different possible embodiment, the first connection elements 12a are electrically connected with the photovoltaic slats 31 and the second connection elements 12b are not. In yet another possible embodiment, the second connection elements 12b are electrically connected with the photovoltaic slats 31 and the first connection elements 12a are not.

Advantageously, the photovoltaic slats 31 can be provided with a plurality of through holes 39, placed at different distances, and then it is possible to electrically connect only some thin film solar cells 40 with respective connection elements 12a, 12b, and so it is possible to choose the voltage $\Delta V$ of the photovoltaic slats 31, since the voltage $\Delta V$ depends on the number of thin film solar cells 40 connected in series, and therefore depends on the distance of the electrical contact areas 14 to which the connection elements 12a, 12b are connected. In that way, the connection elements 12a, 12b can be selectively arranged at different distances so as to allow customized working voltages such as 12V, 24V, 36V, 48V, etc., depending on the size of the blind 30.

FIG. 13 shows an example of a photovoltaic slat 31 wherein three first connection elements 12a (i.e. three lifting cords) pass through three respective through holes 39 and can each be selectively electrically connected with one or two respective second connection elements 12b (i.e. orientation cords) and preferably with one (or two) second connection element (or elements) 12b.

In this example, in practice, there are three possible voltages V1, V2, V3, selectable by selectively connecting two first connection elements 12a with two respective second connection elements 12b.

It should be noted that by connecting the connection elements 12a 12b to different electrical contact areas 14 it is possible to provide different voltages V1, V2. V3.

In one embodiment of the present invention, ultrasonic welding is used to reduce the thermal stress in the previous process.

In practice it has been found that the method for making a photovoltaic slat according to the present invention achieves the intended aim and objects, since it is simpler, quicker and more cost-effective with respect to the prior art.

Another advantage of the method, according to the invention, resides in that it is more flexible and versatile in the design with respect to the prior art.

A further advantage of the method, according to the invention, resides in that it provides photovoltaic slats having an assembly that is easier with respect to the prior art.

Another advantage of the method according to the invention resides in that it provides slats which require less maintenance with respect to the prior art. In the preferred embodiments, substantially no maintenance is required.

A further advantage of the method, according to the invention, resides in that mass production is easier and less costly with respect to the prior art.

Another advantage of the method according to the invention resides in that it avoids defects in the photovoltaic slats.

The method thus conceived is susceptible of numerous modifications and variations, all of which are within the scope of the inventive concept.

In practice the materials used, so long as they are compatible with the specific use, as well as the contingent shapes and dimensions, may be any according to the requirements.

The invention claimed is:

1. A photovoltaic sheet comprising at least one photovoltaic strip, each photovoltaic strip comprising:
    a plurality of strings of thin film solar cells monolithically connected to each other in series, the strings of each photovoltaic strip being aligned along a respective longitudinal axis, and
    working areas which are interposed between the strings, said working areas being a portion of the photovoltaic sheet that does not generate photovoltaic power, and
    a substrate, at least one insulating layer arranged on the substrate, a back contact layer arranged on the at least one insulating layer, a plurality of junction layers arranged on the back contact layer and at least a front contact layer arranged on the plurality of junction layers, with at least two through holes passing through the substrate, the at least one insulating layer, the back contact layer, the plurality of junction layers and the at least front contact layer,
    the at least two through holes suitable for being passed through by connection elements for connecting a plurality of photovoltaic slats in the photovoltaic blind, said through holes being provided in the working areas between two strings.

2. The photovoltaic sheet according to claim 1, comprising a plurality of parallel photovoltaic strips which are separated by second working areas.

3. The photovoltaic sheet according to claim 1, wherein there is at one or more edges of said at least one photovoltaic strip one or more peripheral isolation grooves.

4. A photovoltaic slat for a photovoltaic blind, the photovoltaic slat comprising:
    at least one string of thin film solar cells monolithically connected to each other in series, said photovoltaic slat being provided with at least two through holes suitable for being passed through by connection elements for connecting a plurality of photovoltaic slats in the photovoltaic blind, and
    a substrate, at least one insulating layer arranged on the substrate, a back contact layer arranged on the at least one insulating layer, a plurality of junction layers arranged on the back contact layer and at least a front contact layer arranged on the plurality of junction layers, with said at least two through holes passing through the substrate, the at least one insulating layer, the back contact layer, the plurality of junction layers and the at least front contact layer,
    wherein said at least two through holes are provided in working areas around the strings, said working areas being a portion of the photovoltaic slat that does not generate photovoltaic power.

\* \* \* \* \*